United States Patent [19]
Weaver

[11] 3,898,216

[45] Aug. 5, 1975

[54] STYRYL AND CYANINE DESENSITIZING DYES CONTAINING A SUBSTITUTED IMIDAZO [4,5-b]-PYRIDO[2,3-b.PYRAZINE NUCLEUS

[75] Inventor: Thomas Dean Weaver, Rochester, N.Y.

[73] Assignee: E. I. du Pont de Nemours & Company, Wilmington, Del.

[22] Filed: June 4, 1974

[21] Appl. No.: 476,316

[52] U.S. Cl. ..... 260/240.4; 260/240.6; 260/240.65; 260/240.7; 260/240.9; 260/296 H
[51] Int. Cl....C09b 23/10; C09b 23/06; C09b 23/04; C09b 23/14; C07d 31/42
[58] Field of Search......... 260/240.4, 296 H, 296 R, 260/250 BC, 240.65, 240.6, 240.7, 240.9

[56] References Cited
UNITED STATES PATENTS

| | | | |
|---|---|---|---|
| 3,431,111 | 3/1969 | Brooker et al. | 260/240.6 UX |
| 3,483,196 | 12/1969 | Jenkins et al. | 260/240.6 X |
| 3,597,196 | 8/1971 | Jones et al. | 260/240.65 X |
| 3,632,808 | 1/1972 | Brooker et al. | 260/240.6 X |

*Primary Examiner*—Allen B. Curtis

[57] ABSTRACT

Colloid-silver halide photographic elements having good sensitometric characteristics and aging stability are prepared by incorporating in the silver halide emulsion dyes containing a substituted imidazo [4,5-b]-pyrido[2,3-b] pyrazine nucleus and in the case of direct positive emulsions at least one chemical fogging agent. The dyes include styryl and cyanine dyes, including cyanine, pseudocyanine, carbocyanine, dicarbocyanine, tricarbocyanine, hemi-cyanine and merocyanine dyes.

10 Claims, No Drawings

STYRYL AND CYANINE DESENSITIZING DYES CONTAINING A SUBSTITUTED IMIDAZO [4,5-B]-PYRIDO[2,3-B]PYRAZINE NUCLEUS

BACKGROUND OF THE INVENTION

This invention relates to certain novel styryl and cyanine dyes. The invention further relates to colloid-silver halide photographic emulsions containing these dyes and, more specifically, to fogged photographic gelatino-silver halide emulsions of the direct positive type.

It is accordingly, an object of this invention to provide a new class of styryl and cyanine dyes that are useful in silver halide emulsions. Another object is to provide direct positive photographic silver halide emulsions containing these new dyes as desensitizers which increase the speed of direct positive emulsions. These dyes are similar in some aspects of structure to the dyes of Brooker and Van Lare, U.S. Pat. No. 3,431,111, except that the dyes of that patent contain an imidazo-[4,5-b] quinoxaline nucleus whereas the dyes of this invention are based on a substituted imidazo-[4,5-b]-pyrido [2,3-b] pyrazine nucleus. Other cyanine dyes for silver halide emulsions are disclosed in U.S. Pat. Nos. 3,539,349 and 3,674,782.

SUMMARY OF THE INVENTION

It has been discovered that dyes comprising a 1,3-disubstituted-imidazo [4,5-b]-pyrido [2,3-b] pyrazine nucleus and quaternary salts thereof joined by a methine chain of one or more members to a second nucleus which is a 5- or 6-membered nitrogen-containing heterocyclic ring or amino aryl group, are powerful desensitizers for silver halide emulsions. These dyes are styryl dyes and dyes of the cyanine classes in which the first mentioned nucleus is joined to the second nitrogen-containing nucleus by a methine chain having one or more methine groups, which provides an uneven number of carbon atoms in a chain between a nitrogen of the second nucleus and the substituted nitrogens in the imidazole ring of the first nucleus.

DESCRIPTION OF THE PREFERRED EMBODIMENTS

The dyes of the invention are useful as desensitizers, which increase the direct positive response in direct positive silver halide emulsions that have been chemically fogged with a reducing agent for silver ions and a compound of metal more electropositive than silver, e.g., a gold compound or in the manner described in Bigelow, U.S. Pat. No. 3,637,392 patented Jan. 25, 1972, wherein certain boron hydrides are used as chemical fogging agents. Direct positive emulsions containing the dyes of the invention in desensitizing amounts are characterized by both good speed and selective sensitivity in the desired regions of the spectrum, which are an important characteristic in direct positive emulsions. It has further been found that direct positive emulsions containing the dyes described above and chemically fogged by the class of boron hydrides which form a polyhedron or a fragment thereof of the type described in the Bigelow patent have substantially improved shelf life or aging stability and contrast as compared to the direct positive elements of the prior art.

The dyes of the invention are styryl or cyanine dyes which contain a first heterocyclic nucleus which is a 1,3-disubstituted-imidazo [4,5-b]-pyrido [2,3-b] pyrazine or quaternary salt thereof joined at the 2-carbon atom of the imidazole ring by a methine chain to a second nucleus.

The second nucleus contains at least one nitrogen atom, separated from the substituted imidazo nitrogen atoms of the first nucleus by an uneven number of carbon atoms. The second nucleus of the dyes may be a heterocyclic, nitrogen-containing hydrocarbon group or a p-dialkyl amino benzene ring group. The methine chain preferably is comprised of from one to seven methine groups. The number of carbon atoms separating a nitrogen of the second nucleus from the substituted nitrogens of the imidazole ring of the first nucleus is determined by counting the carbon atoms along the shortest linkage therebetween, which includes the carbon atoms of the methine chain.

In a preferred embodiment of the invention, cyanine dyes are provided comprising two nuclei joined together through a two carbon methine chain, one of said nuclei being a substituted imidazo [4,5-b]-pyrido [2,3-b] pyrazinium salt and the other nucleus being a 5- or 6-membered heterocyclic ring containing preferably at least one heterocyclic nitrogen atom and an extra-cyclic carbonyl oxygen or sulfur atom.

In still another more specific aspect of the invention, carbocyanine dyes are provided wherein at least one terminal nucleus is a substituted imidazo [4,5-b]-pyrido [2,3-b] pyrazine and the other terminal nucleus may be the same or different and if different, may be selected from the group of 5- or 6-membered heterocyclic nitrogen compounds conventionally used in the preparation of cyanine dyes, e.g., thiazoles, oxazoles, selenazoles, quinolines, imidazoles, etc., it being understood that such heterocyclic ring compounds may contain any of the extra-cyclic substituents, i.e., alkyl, halogen, aryl, fused aryl groups as has been extensively taught in the prior art of cyanine dyes.

In a further embodiment of this invention, styryl dyes are provided comprising a substituted imidazo [4,5-b]-pyrido [2,3-b] pyrazine nucleus joined to a paradialkylamino benzene ring through a methine chain containing 2 methine groups whereby, in the conventional manner, there is an uneven number of carbon atoms connecting the nitrogen of the dialkylamino group of the benzene ring and the heterocyclic nitrogen salt atoms of the imidazo ring of the imidazopyridopyrazine nucleus.

The new dyes of the invention include those represented by the following general formulae:

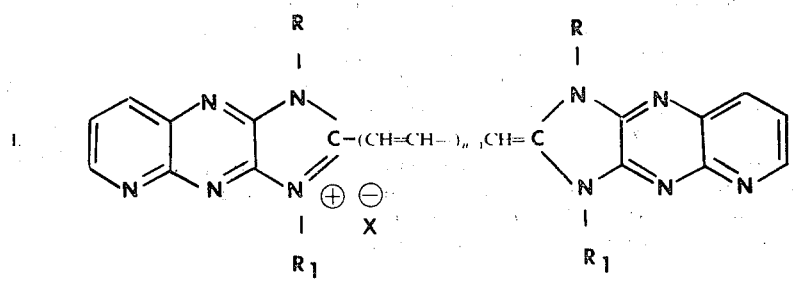

I.

II. 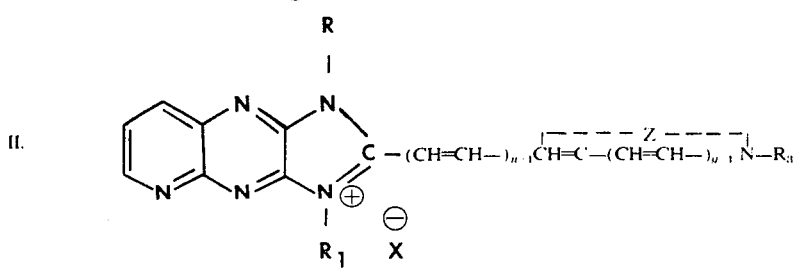

III. 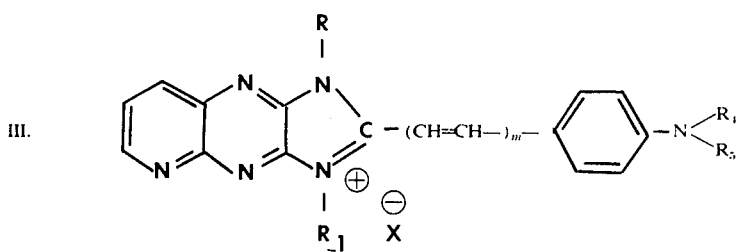

IV. 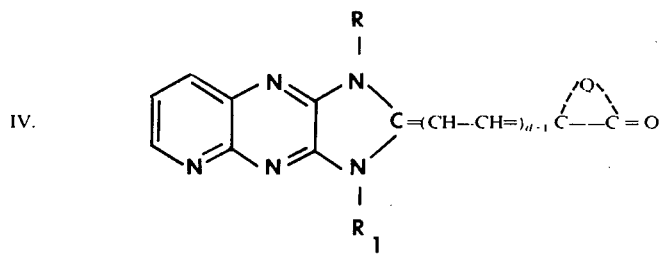

wherein n represents a positive integer of 1 to 4, m and g each represent a positive integer of from 1 to 2, d represents a positive integer of 1 to 3, and, R and $R_1$ each represents a substituent independently selected from the group consisting of an acyclic hydrocarbon substituent, such as an alkyl group, preferably containing from 1–18 carbon atoms, which may or may not be substituted, e.g., methyl, ethyl, propyl, isopropyl, hydroxy alkyl etc., an alkaryl substituent and an aryl substituent, $R_3$ represents an alkyl group of from 1 to 12 carbon atoms, which may or may not be substituted, e.g., methyl, ethyl, γ-sulfopropyl, isopropyl, butyl, w-sulfobutyl, dodecyl, β-hydroxyethyl, γ-carboxypropyl, β-acetoxyethyl, etc. $R_4$ and $R_5$ each represents the same or different alkyl groups of from 1–6 carbon atoms, e.g., methyl, ethyl, propyl, butyl, etc. X represents an anion, e.g., chloride, bromide, iodide, thiocyanate, sulfamate, methyl sulfate, ethyl sulfate, p-toluenesulfonate, o-toluene sulfonate etc. Z represents the non-metallic atoms required to complete a 5- or 6-membered heterocyclic nucleus containing a heteronitrogen atom and which may include in addition to nitrogen and carbon, a second hetero atom, e.g., oxygen, sulfur, selenium or a second nitrogen. Thiazoles, oxazoles, selenazoles, indolenines, imidazoles and their various substituted derivatives exemplify useful nuclei such as have been disclosed in the art. Q represents the non-metallic atoms required to complete a heterocyclic nucleus containing 5 to 6 atoms in the heterocyclic ring of which at least one is nitrogen and which may contain a second hetero atom selected from nitrogen, oxygen, sulfur or selenium. Especially useful are nuclei wherein Q represents the atoms completing a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom.

The substituted imidazo [4,5-b]-pyrido [2,3-b] pyrazine nucleus in the dyes of this invention can contain various substituents such as at least one halogen substituent, e.g., chloro, bromo, dichloro, etc., nitro, cyano or phenyl groups.

The above described compounds, especially the quaternary salts of dimethine dyes, are powerful sensitizers for direct positive light sensitive silver halide emulsions.

The dye compounds of the invention include the quaternary salts thereof which may be prepared from 1,2,3-trisubstituted-imidazo [4,5-b]-pyrido [2,3-b] pyrazine salt intermediates represented by the formula:

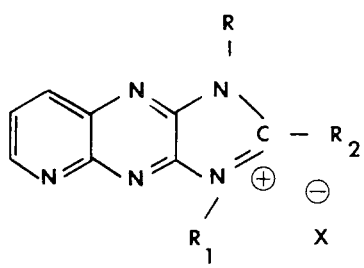

where R and R₁ have been defined above and R₂ represents a member selected from an alkyl group of from 1–4 carbon atoms, e.g., methyl, ethyl, propyl, isopropyl, butyl, sec-butyl, and an alkaryl group, e.g., benzyl and phenylethyl. In the definition of the R's, the groups generically referred to can include species having substitution and/or unsaturation. The substituents and moieties represented by R, R₁, R₂, R₃, R₄, R₅, X, Z and Q are also exemplified by those disclosed for the like symbols in Brooker and Van Lare, U.S. Pat. No. 3,431,111.

The following examples will serve to illustrate the preparation of dyes of the invention and their use.

EXAMPLE 1 a. 2,3-dichloropyrido [2,3-b] pyrazine

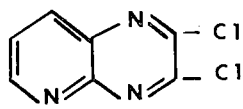

A mixture of 133 grams of 2,3-dihydroxypyrido [2,3-b] pyrazine (which had been dried at 120°–130°C. at 1 mm Hg for 1 hour), 400 ml of phosphorus oxychloride and 4 ml of pyridine was stirred and heated slowly to reflux temperature (ca. 30 minutes) and held at reflux temperature for 3 hours. The resulting dark solution was cooled to 25°C and then poured slowly onto 4 Kg. of ice. The pH of the resulting cold solution was adjusted to 8 with 12N ammonium hydroxide with cooling to keep the temperature below 40°C. The solution was allowed to stand at 25°C for 18 hours. A dark solid formed which was collected and washed with water and dried to give 130 grams (80% yield). A 75 gram portion of this product was extracted (Soxhlet) with 600 ml of acetone for 1 hour until a small amount of black residue remained. The acetone of the extract was evaporated in the presence of hexane (about 300 ml) to a volume of about 150 ml, and 50 grams of 2,3-dichloropyridopyrazine, MP 142°–144°, was obtained.

b. 2,3-bis-(methylamino)pyrido [2,3-b] pyrazine

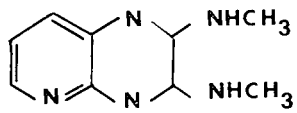

Ten grams of the above product was dissolved in hot methanol and cooled to about 50°C. To this solution there was gradually added 75 ml. of a 40% aqueous solution of methylamine. White needle-like crystals began to form. The mixture was heated on a steam bath for 15 minutes and the resulting solution was diluted with 100 ml of a 5% aqueous solution of potassium carbonate. The hot solution was cooled, and the solid was collected and was washed with water to give 7.4 grams (78% yield) of 2,3-bis-(methylamino)pyrido [2,3-b] pyrazine having a melting point of 235–240°.

c. 1,2,3-trimethylimidazo [4,5-b]-pyrido [2,3-b] pyrazinium tosylate:

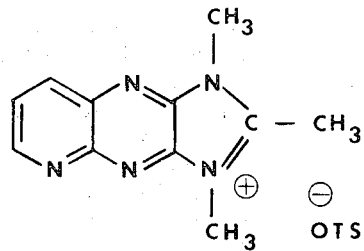

A mixture of 2,3-bis-(methylamino) pyrido [2,3-b] pyrazine (3.80 grams), p-toluenesulfonic acid monohydrate (3.80 grams) and acetic anhydride (12.0 ml) was heated at reflux for 2 hours, then was diluted with 20 ml of methylene chloride. The resulting solution was poured slowly into 250 ml of diethyl ether. The solid product was collected by filtration and dried in vacuo to give 4.7 grams of a dark, hygroscopic, amorphous product having the formula above which was used for preparation of dye without further purification.

EXAMPLE 2

1,3-dimethyl-2-[(2-methyl-5-oxo-3-phenyl-3-isoxazolin-4-yl) vinyl]-imidazo [4,5-b]-pyrido [2,3-b] pyrazinium tosylate:

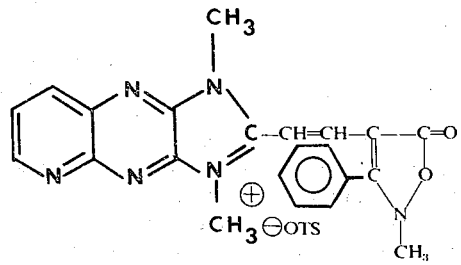

A mixture of 1,2,3-trimethylimidazo [4,5-b]-pyrido [2,3-b] pyrazinium tosylate (100 mg.), 4-formyl-2-methyl-3-phenyl-3-isoxazolin-5-one (100 mg., two equivalents) which may be prepared as in Example 4, acetic anhydride (0.5 ml.), and diisopropylethylamine (1 drop) was allowed to stir at 30°C. for 18 hours. The mixture was then diluted with 1 ml. of methylene chloride, and this solution was poured into 15 ml of ether. The resulting yellow dye (75 mg.) was collected and purified by preparative layer chromatography (silica gel; 1:5 methanol: benzene). This gave 30 mg. of dye of the above formula, which had a λmax in ethanol at 385 nm.

EXAMPLE 3

1,3-dimethyl-2- [(1-methyl-2-phenylindol-3-yl) vinyl] imidazo [4,5-b] pyrido [2,3-b] pyrazinium tetrafluoroborate

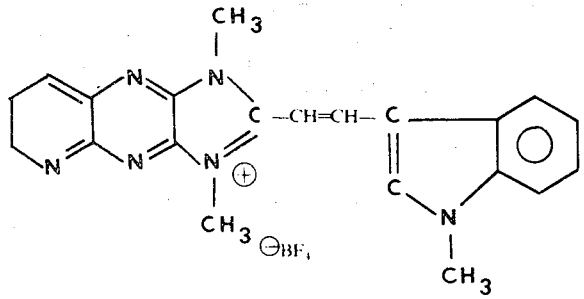

A mixture of 2,3-bis(methylamino) pyrido [2,3-b] pyrazine (1.0 gram of product of Example I (b)), p-toluenesulfonic acid monohydrate (1.0 gram) and acetic anhydride (3.0 ml.) was heated to reflux for 2 hours. 3-formyl-1-methyl-2-phenylindole (1.36 grams) and acetic anhydride (1 ml) were added and the resulting mixture was heated at reflux for 15 minutes, then was diluted with methylene chloride (5 ml) and ether (50 ml). The solvent was decanted and the gummy residue was dissolved in 20 ml of 50% aqueous methanol. This solution was mixed with a solution of 5 grams of sodium tetrafluoroborate in 5 ml of water. The precipitated salt of the dye was collected and was recrystallized twice from methylene chloride and ethyl acetate to give 400 mg. of the dye which has a melting point of 285°C. (decomp. >280°C) and a λ max in ethanol at 520 nm.

EXAMPLE 4

4-Formyl-2-methyl-3-phenylisoxazolin-5-one

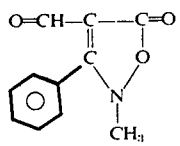

A mixture of 83.8 grams of 2-methyl-3-phenylisoxazolin-5-one, prepared as described by F. De Sarlo, L. Fabbrini and G. Renzi [("Tetrahedron," 22 (9), 2989–2994(1966)], 48.0 ml of phosphorus trichloride and 196 ml of dimethylformamide was prepared in the following manner:

A solution of 168 ml of dimethyl formamide was cooled to 8°C and the phosphorus trichloride was then added dropwise at a rate that a temperature of 10°C was not exceeded and preferably was kept lower. This required approximately 45 minutes. To the resulting solution there was added, in about 30 minutes, a solution of 2-methyl-3-phenyl-isoxazolin-5-one in 28 ml of dimethylformamide, the temperature being maintained at 5°–10°C. during the addition.

The resulting solution was warmed to 45°–48°C and held at this temperature range for 2 hours. The mixture was then poured onto 500 grams of ice. To the mixture there was added a solution of 300 ml of water containing 193 grams of sodium acetate. The resulting solution was warmed to 25°–30°C. at which point the desired product began to crystallize and the temperature rose to 44°C without further heating. After 30 minutes the product was collected and was washed with water. This produced 69.1 grams (74% yield) of 4-formyl-2-methyl-3-phenylisoxazolin-5-one MP 138°–139°C. This compound is used in preparing dyes of the invention as illustrated in Example 2.

For the preparation of direct positive gelatinsilver halide emulsions of this invention, the dyes represented by the above generic formulae and specific examples are advantageously incorporated in the finished emulsion by means of a solvent solution, e.g., 1 gram in one liter of methanol. The type of silver halide emulsions that are advantageously used with the above dyes are direct positive silver halide emulsions which have been chemically fogged in a conventional manner with a reducing agent or in the manner described in Bigelow, U.S. Pat. No. 3,637,392. The emulsions include any of those prepared with hydrophilic colloids, such as natural materials, e.g., gelatin, albumin, agar-agar, gum arabic, alginic acid, etc., and synthetic water-permeable colloids such as polyvinyl alcohol and its derivatives, e.g., partially hydrolyzed polyvinyl acetates, polyvinyl ethers, and acetals containing a large number of extra-linear —CH₂—CHOH groups, etc., polyvinyl pyrrolidone, hydrolyzed interpolymers of vinyl acetate and unsaturated addition polymerizable compounds such as maleic anhydride, acrylic and methacrylic acid ethyl esters such as those described in U.S. Pat. Nos. 2,276,322; 2,276,323, and 2,347,811. The useful polyvinyl acetals include polyvinyl butyraldehyde acetal and polyvinyl ortho-sulfobenzaldehyde acetal sodium salt. Other useful colloid binding agents include the hydrophilic copolymers of N-acrylamido alkyl betaines described in Shacklett, U.S. Pat. No. 2,833,050 and hydrophilic cellulose ethers and esters.

The concentration of the new dyes described above in the emulsions may be usefully varied from 5 to 1,000 milligrams per mole of silver halide. The concentration will vary depending upon the type of dye, the type of emulsion, and the effects desired. The most effective dye concentration for any given emulsion can be determined by making the tests and observations customarily used in the art of evaluating photographic silver halide emulsions.

The emulsions of this invention may be coated on any suitable base including paper and transparent film supports, for example, films of film-forming polymers such as cellulose derivatives, e.g., cellulose acetate, cellulose triacetate, cellulose mixed esters, etc.; polymerized vinyl compounds, e.g., copolymerized vinyl acetate and vinyl chloride, polystyrene, etc.; and films formed from polyesters made according to the teachings of Alles, U.S. Pat. No. 2,779,684 and patents referred to in the specification of that patent.

EXAMPLE 5

A direct positive emulsion was made in the following manner. To an aqueous solution of gelatin heated to 44°C. containing 12 mg. of rhodium chloride there was added simultaneously 1.5 moles of potassium bromide as a 3 Molar aqueous solution, and 1.5 moles of silver nitrate as a 3 Molar solution. The emulsion was ripened for 10 minutes at 44°C.

The emulsion was then washed and redispersed in the manner described in Moede, U.S. Pat. No. 2,772,165 patented Nov. 27, 1956.

After redispersion the temperature was raised to 63°C. and the pH was adjusted to 7.5 ± 0.2. The emulsion was heated to 72°C. and chemically fogged with gold and cesium thioborane as described in Bigelow, U.S. Pat. No. 3,637,392 dated Jan. 25, 1972. The emulsion was then digested at 72°C. for 40 minutes and then cooled to 35°C. The pH was adjusted to 6.0 ± 0.1. The emulsion was divided into 100 ml. portions for testing as described further on.

To 100 ml. portions of the emulsion there were added the dyes in alcoholic solutions from the examples as indicated in the Table below.

The dye solutions were thoroughly stirred into the emulsion portions and the emulsions were coated on test strips at 35°C. using a 10 mil knife gap. The strips were dried in the conventional manner and then exposed with a tungsten lamp through a neutral density √2 step wedge. Development was 90 seconds at 21°C. in a conventional alkaline hydroquinone developer.

The developed emulsions were then immersed in a conventional fixer, washed and dried. The relative speed for each sample is given in the following table:

| Sample No. | Dye of Example No. | Dye Concentration (mg Per Mole of Silver Halide) | Relative Speed |
|---|---|---|---|
| 1 | — | None (Control) | 1 |
| 2 | 2 | 100 | 8 |
| 3 | 2 | 200 | 16 |
| 4 | 2 | 400 | 16 |
| 5 | 3 | 100 | 16 |

EXAMPLE 6

4-[1,2-dimethyl-2(1H) - imidazo [4,5-b] pyrido [2,3-b] pyrazinylidene]-3-phenyl-2-isoxazolin-5-one

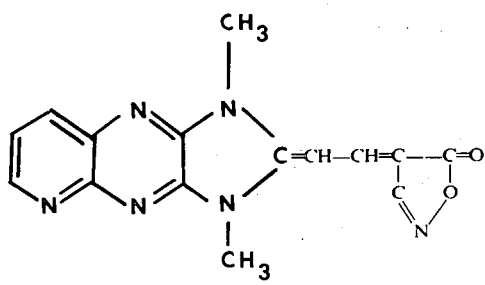

A mixture of 9.1 grams of 1,2,3-trimethyl imidazo [4,5-b] pyrido [2,3-b] pyrazine tosylate, 6.2 grams of 4-anilino-methylene-3-phenyl-2-isoxazolin-5-one and 20 milliliters of dimethylsulfoxide was heated at 150°C. for 15 minutes. The resulting mixture was cooled to 25°C. and the solid which crystallized was collected and was with three 10 milliliter portions of methanol to give 1.6 grams of the dye which had a melting point >300°. The λ max in ethanol was 515 nm.

The dyes of this invention, particularly those described in the above examples, are employed to advantage in photographic elements where desensitization is required, for example, in making photographic silver halide emulsions used for direct positive emulsions used for direct production of positive images such as are described by Burt U.S. Pat. No. 3,445,235; Bigelow U.S. Pat. No. 3,637,392 and older patents in the art where the emulsions have been chemically fogged with, e.g., stannous chloride, formaldehyde, thiourea dioxide and the like such as the combination of thiourea chloride and a gold salt, for example potassium chloroaurate, etc.

Typical reducing agents in addition to the more efficient borane fogging agents of the above Bigelow and Burt patents include stannous salts, e.g., stannous chloride, hydrazine, phosphonium salts such as tetrahydroxymethyl phosphonium chloride and the like. Typical useful metal compounds that are more electropositive than silver include gold, rhodium, platinum, palladium, iridium, etc. preferably in the form of soluble salts thereof, e.g., hydrochloroauric acid, auric chloride, palladium ammonium chloride and the like.

Useful concentrations of the reducing agent and metal compound (e.g., metal salt) can be varied over a considerably range as can the borane compounds of the Bigelow and Burt patents made of reference above.

As described and shown above, the dyes of this invention are highly useful in high speed direct positive emulsions comprising fogged silver halide grains and a compound more electropositive than silver.

The silver halides employed in the preparation of the photographic useful herein include any of the silver halides as exemplified by silver bromide, silver iodide, silver chloride, silver chlorobromide, silver iodobromide, and the like.

What is claimed is:

1. Styryl and cyanine dyes having a first 1,3-disubstituted-imidazo [4,5-b]-pyrido [2,3-b] pyrazine nucleus joined at the 2-carbon atom of the imidazole ring to a carbon atom of a second nucleus which is a 5- or 6-membered nitrogen-containing heterocyclic ring or a p-dialkyl amino benzene group by a chain of one or more methine groups, which provides an uneven number of carbon atoms in a chain between a nitrogen atom of the second nucleus and the substituted nitrogen atoms in the imidazole ring of the first nucleus.

2. Dyes according to claim 1 wherein the methine chain consists of from 1 to 7 methine groups.

3. Dyes according to claim 1 wherein the methine chain consists of 2 methine groups, and the second nucleus is a 5- or 6-membered ring which contains at least one nitrogen atom.

4. Dyes according to claim 1 wherein the second nucleus is selected from 1,3-dialkyl-imidazo [4,5-b]-pyrido [2,3-b] pyrazine, 1-alkyl-2-phenylindol-3-yl, and 2-alkyl-5-oxo-3-phenyl-3-isoxazolin-4-yl.

5. Dyes according to claim 1 selected from those having one of the following formulae:

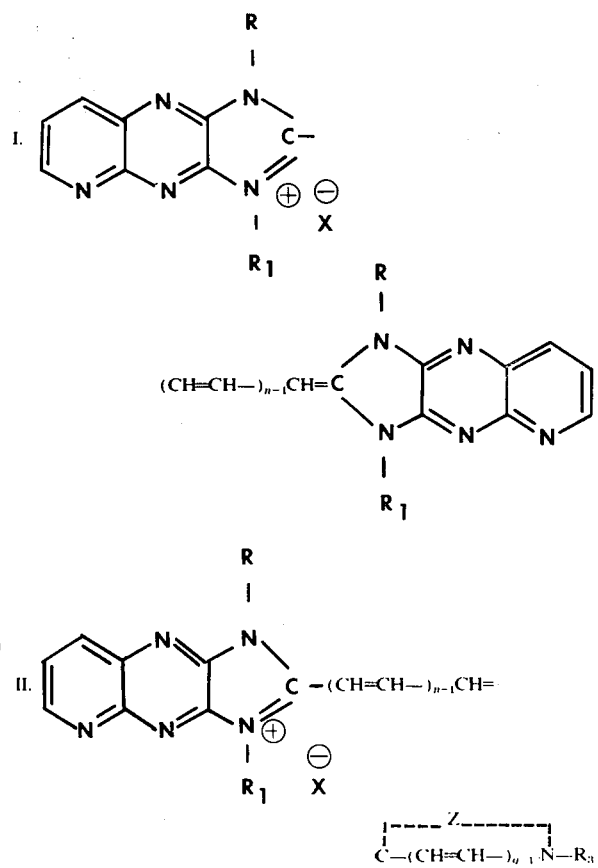

III. 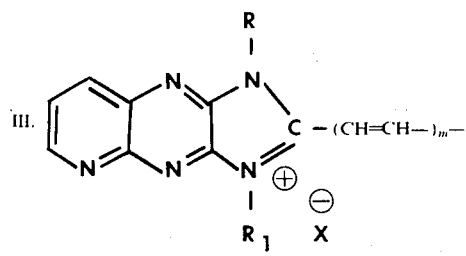

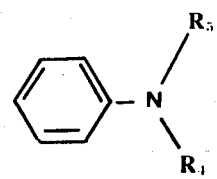

IV. 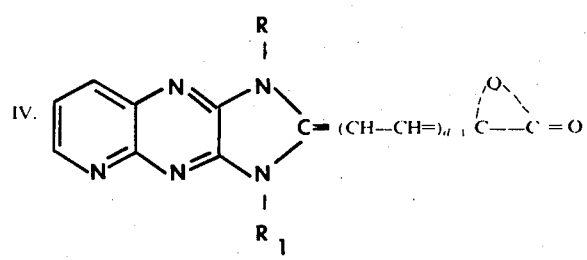

wherein *n* represents a positive integer of 1 to 4, *m* and *g* each represent a positive integer of from 1 to 2, *d* represents a positive integer of 1 to 3, and, R and $R_1$ each represents a substituent independently selected from the group consisting of an acyclic hydrocarbon substituent, an alkaryl substituent and an aryl substituent, $R_3$ represents an alkyl group of from 1 to 12 carbon atoms, $R_4$ and $R_5$ each represents the same or different alkyl groups of from 1 to 6 carbon atoms, X represents an anion, Z represents the non-metallic atoms required to complete a heterocyclic nucleus containing 5 to 6 atoms in the heterocyclic ring, at least one of said atoms being nitrogen, and Q represents the non-metallic atoms required to complete a heterocyclic nucleus containing 5 or 6 atoms in the heterocyclic ring, at least one of said atoms being nitrogen.

6. Dyes according to claim 5 wherein Z contains a hetero atom selected from oxygen, sulfur, selenium and nitrogen.

7. Dyes according to claim 5 wherein Q contains in addition to one hetero nitrogen atom a second hetero atom selected from oxygen, sulfur, selenium and nitrogen.

8. Dyes according to claim 1 wherein the substituents on the 1 and 3 positions of the imidazole ring of said pyrazine nucleus are independently selected from the group consisting of an acyclic hydrocarbon substituent, an alkaryl substituent, and an aryl substituent.

9. Dye intermediates having the formula

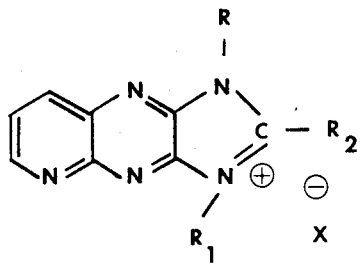

wherein R and $R_1$ each represents a substituent independently selected from the group consisting of an acyclic hydrocarbon substituent, an alkaryl substituent and an aryl substituent, and $R_2$ represents an alkyl or alkaryl group.

10. Dye intermediates of claim 9 wherein $R_2$ is methyl.

* * * * *